US012655756B2

(12) United States Patent
Alaseri et al.

(10) Patent No.: US 12,655,756 B2
(45) Date of Patent: Jun. 16, 2026

(54) PINHOLE REPAIR METHOD USING EPOXY AND EXPANDABLE MESH

(71) Applicant: SAUDI ARABIAN OIL COMPANY, Dhahran (SA)

(72) Inventors: Ghassan Adel Alaseri, Dhahran (SA); Raed Alahmdi, Thuwal (SA); Faisal Alissa, Dhahran (SA); AbdulWahab Ghamdi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 93 days.

(21) Appl. No.: 18/425,963

(22) Filed: Jan. 29, 2024

(65) Prior Publication Data

US 2025/0243755 A1     Jul. 31, 2025

(51) Int. Cl.
*E21B 47/117*          (2012.01)
*C09K 8/42*            (2006.01)
(Continued)

(52) U.S. Cl.
CPC ............ *E21B 47/117* (2020.05); *E21B 33/12* (2013.01); *E21B 43/103* (2013.01); *C09K 8/42* (2013.01); *E21B 23/00* (2013.01)

(58) Field of Classification Search
CPC ........ E21B 47/117; E21B 33/12; E21B 33/13; E21B 43/103; C09K 8/00
See application file for complete search history.

(56) References Cited

U.S. PATENT DOCUMENTS 5,613,557 A     3/1997  Blount et al.
5,909,773 A     6/1999  Koehler et al.
(Continued)

FOREIGN PATENT DOCUMENTS

CA          2745196 A1      6/2010
CN          101680591 A     3/2010
(Continued)

OTHER PUBLICATIONS

X. Guerrero et al., "SPE-201432-MS: Water Isolation and Sand Control: Breaking Barriers with Expandable Steel Patch Technology," Society of Petroleum Engineers, pp. 1-10, Oct. 21, 2020 (10 pages).

(Continued)

*Primary Examiner* — Nicole Coy
*Assistant Examiner* — Nicholas D Wlodarski
(74) *Attorney, Agent, or Firm* — Osha Bergman Watanabe & Burton LLP

(57)          ABSTRACT

A method to repair well completion components includes evaluating tubing-casing annulus (TCA) communication to locate a leak, determining a placement depth, preparing a tubing mesh stent assembly and one or more epoxy compounds at a well surface, performing workover operations, installing a retrievable plug, running the tubing mesh stent assembly into the well to the leak depth, expanding the tubing mesh stent assembly, setting the tubing mesh stent assembly in place, pumping a first reactive epoxy-containing compound through the tubing mesh stent assembly to fill the leak, allowing all epoxy-containing compounds to react for up to 24 hours or more to cure, reversing workover operations to resume normal production, and testing the well under pressure to ensure integrity at normal operating conditions. A system for repairing leaks in well completion components includes a tubing mesh stent assembly including an upper section, a middle section, and a lower section.

17 Claims, 5 Drawing Sheets

(51) Int. Cl.
 *E21B 23/00*  (2006.01)
 *E21B 33/12*  (2006.01)
 *E21B 43/10*  (2006.01)

(56)  References Cited

U.S. PATENT DOCUMENTS

| | | | |
|---|---|---|---|
| 5,971,030 | A | 10/1999 | Maimets |
| 6,102,120 | A | 8/2000 | Chen et al. |
| 10,030,467 | B2 * | 7/2018 | Al-Gouhi ................ E21B 34/10 |
| 11,060,382 | B2 | 7/2021 | Sherman |
| 11,137,102 | B2 | 10/2021 | Hairston et al. |
| 2005/0023002 | A1 | 2/2005 | Zamora et al. |
| 2015/0267500 | A1 * | 9/2015 | Van Dongen ........... E21B 33/14 |
| | | | 277/336 |
| 2020/0080401 | A1 | 3/2020 | Sherman |
| 2021/0189219 | A1 * | 6/2021 | Alanqari ............... E21B 33/138 |
| 2021/0270102 | A1 * | 9/2021 | Massey ................ E21B 17/023 |
| 2022/0136363 | A1 * | 5/2022 | Hallundbæk ..... E21B 33/12955 |
| | | | 166/120 |

FOREIGN PATENT DOCUMENTS

| | | | |
|---|---|---|---|
| EP | 2265687 | B1 | 4/2019 |
| NO | 347014 | B1 | 4/2023 |
| WO | 2009121882 | A1 | 10/2009 |

OTHER PUBLICATIONS

International Search Report issued for corresponding international patent application No. PCT/US2025/013158, mailed Mar. 28, 2025 (7 pages).
Written Opinion issued for corresponding international patent application No. PCT/US2025/013158, mailed Mar. 28, 2025 (9 pages).

* cited by examiner

403

401

405

407

PINHOLE REPAIR METHOD USING EPOXY AND EXPANDABLE MESH

BACKGROUND

Production tubing frequently forms small openings or leaks known as "pinholes" over time due to corrosion, damage, or defects. These pinholes enable production fluids and gases to escape the tubing, causing loss of product, reduced well productivity, and potential safety hazards. Communication between production tubing and the tubing/ casing annulus (TCA) is a serious concern that leads to substantial financial and environmental consequences. Pinholes pose a constant threat to the conventional integrity of production tubing as the tubing string is the main pathway for formation fluids. Corrosive formation fluids combined with dissolved solids are sufficient factors to initiate a pinhole. Current practices to solve this challenge are expensive and can lead to extended downtimes.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method to repair well completion components, which includes evaluating tubing-casing annulus (TCA) communication to locate a leak, determining a placement depth for a tubing mesh stent assembly, preparing the tubing mesh stent assembly and one or more epoxy compounds at a well surface according to specifics of the well and the leak, performing workover operations to remove one or more of production tubing and equipment blocking access to the leak, installing a retrievable plug as a barrier below the placement depth to secure the well, running the tubing mesh stent assembly into the well to the leak depth using a shifting tool, expanding the tubing mesh stent assembly to firmly contact a wall of the well completion component being repaired, setting the tubing mesh stent assembly in place using a plurality of packers positioned at each end of the tubing mesh stent assembly, pumping a first reactive epoxy-containing compound through the tubing mesh stent assembly to fill the leak, allowing all epoxy-containing compounds to react for up to 24 hours or more to cure, removing the shifting tool and reversing workover operations to resume normal production including removing the retrievable plug, and testing the well under pressure to ensure integrity at normal operating conditions.

In another aspect, embodiments disclosed herein relate to a system for repairing leaks in well completion components which includes a tubing mesh stent assembly comprising an upper section, a middle section, and a lower section, wherein the upper and lower sections include hydraulically activated packers including chemical-resistant elastomer bodies, and wherein the middle section includes a mesh stent which is expandable.

Other aspects and advantages of the claimed subject matter will be apparent from the following description and the appended claims.

DETAILED DESCRIPTION

In one or more embodiments disclosed herein are methods and system for repairing well completion components. Pinholes pose a constant threat to the conventional integrity of production tubing, and current practices to solve this challenge are expensive and can lead to extended downtimes. There is a need for an effective solution to address pinhole related issues within downhole tubing and other well completion components to ensure optimal performance, safety, and environmental compliance. An effective solution should be low cost and result in minimal well downtime.

The TMS assembly as described herein is used for sealing pinhole leaks in production tubing but could also be used for other well components such as liners and casings. The TMS assembly provides a cost-effective alternative to conventional tubing patch and remediation techniques. Generally, the TMS assembly is prepared at the surface and lowered into the well, where the assembly is expanded and set in place to cover and seal the leak. In a typical application, a first reactive epoxy-containing compound is pumped into the mesh stent to form an epoxy resin seal with a second reactive epoxy-containing compound absorbed into the mesh stent to encase the tubing and surrounding area. The epoxy solidifies and bonds to the tubing and mesh, creating a permanent barrier. The process to seal leaks with the TMS system requires minimal downhole intervention or well workover, avoiding operational delays and minimizing risk. The mesh stent will remain in place for the life of the well as a reinforced layer of protection.

TMS Assembly

In one or more embodiments, the TMS assembly consists of three primary sections, an upper head section, a middle repairing section, and a lower tail section. The head and tail sections contain hydraulically activated packers including chemically resistant elastomer bodies to anchor and seal the assembly. The middle section features an expandable mesh with small openings to allow the first reactive epoxy-containing compound to flow through. In one or more embodiments, the mesh is woven from fibers of basalt, a naturally occurring mineral resistant to both high temperatures and harsh chemicals. In one or more embodiments, the mesh absorbs and retains the second reactive epoxy-containing compound, prior to installation. The mesh is able to expand and compress and is also able to absorb and retain the second reactive epoxy-containing compound in a compressed state due to free volume in the mesh in the compressed state. In one or more embodiments, when expanded against the tubing wall, the second reactive epoxy-containing compound absorbed in the mesh will begin to cure rapidly when the first reactive epoxy-containing compound is pumped through the mesh.

Figure 1:
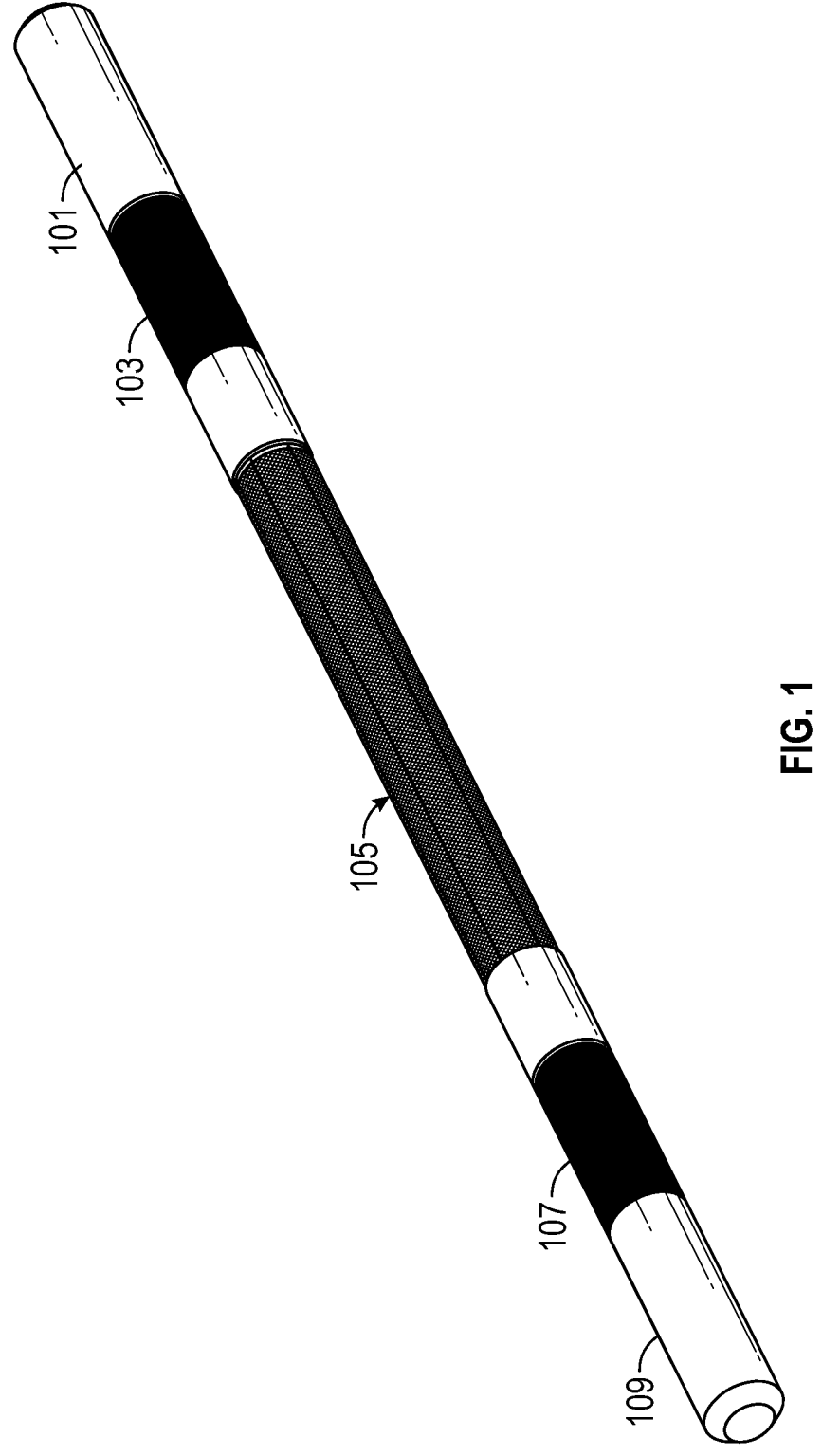
FIG. 1 is a schematic of a tubing mesh stent assembly in accordance with one or more embodiments of the present disclosure.

FIG. 1 is a schematic of a TMS assembly in accordance with one or more embodiments of the present disclosure. On either end of the TMS assembly are the tool head 101 and tool tail 109. The tool head 101 and tool tail 109 may be constructed from a high-strength, corrosion-resistant alloy such as stainless steel or Inconel. The main purpose of the tool head 101 and tool tail 109 is to support the tool string while lowered to the defected depth. The size of the tool head 101 and tool tail 109 may correspond with the inner diameter of the production tubing to ensure a secure fit when the packers are expanded.

A first packer 103 is located adjacent to the tool head 101. A second packer 107 is located adjacent to the tool tail 109. The packers are hydraulically-activated packers, designed to expand radially when hydraulic pressure is applied, providing a firm grip against the tubing wall. The packers include chemical-resistant elastomer bodies that are hydraulically expandable to anchor and seal the assembly. The packers may feature elastomeric seals made from a chemical-resistant material including Viton or Nitrile rubber, which offer resistance to high temperatures and a wide range of downhole chemicals. A middle repairing section 105 is centrally located, between the first packer 103 and second packer 107. The middle repairing section 105 contains the TMS. Aside from the TMS and chemical-resistant elastomer bodies, the TMS assembly may be constructed of any metallic material suitable for tool string.

Figure 2A:
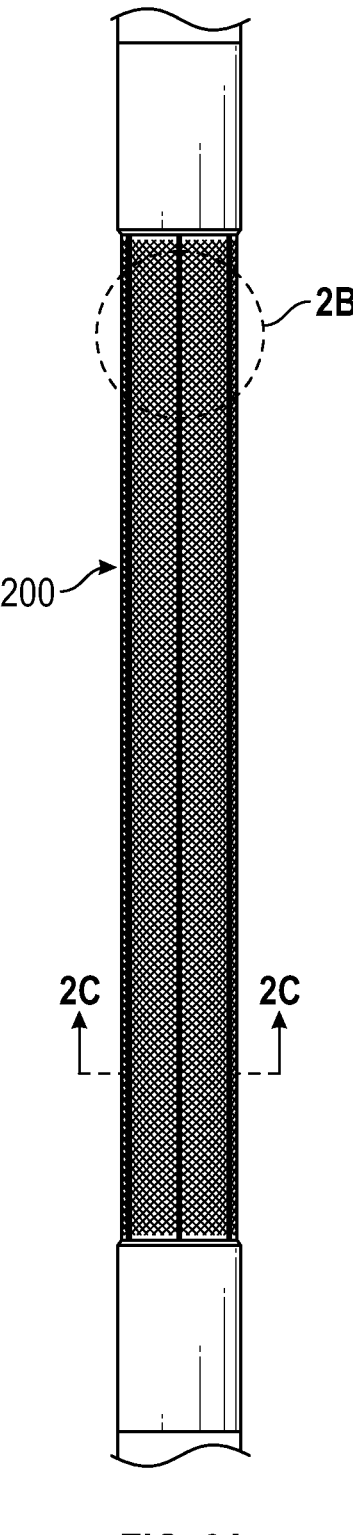
FIG. 2A is a schematic of a tubing mesh stent assembly in accordance with one or more embodiments of the present disclosure.
Figure 2B:
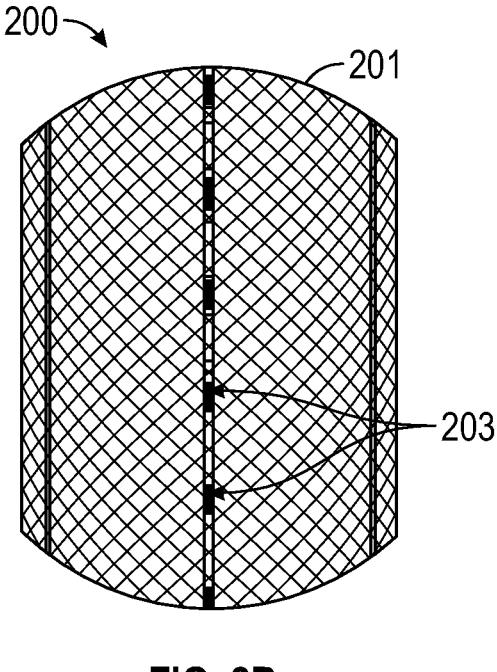
FIG. 2B is a detail schematic of a mesh stent in the tubing mesh stent assembly in accordance with one or more embodiments of the present disclosure.
Figure 2C:
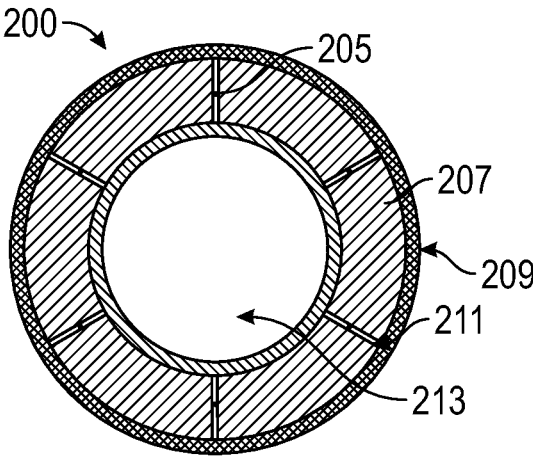
FIG. 2C is a cross-sectional view of a tubing mesh stent assembly in accordance with one or more embodiments of the present disclosure.

FIGS. 2A-2C illustrate the middle repairing section of the TMS assembly 200 in more detail. FIG. 2A depicts a side view of the middle repairing section. FIG. 2B is an expanded view of region A and FIG. 2C is a cross-sectional view taken along line B-B. FIG. 2B shows a detail view of the mesh stent as part of the TMS assembly 200. Mesh stent 201 is set around the outside of the TMS assembly 200, with the openings of a plurality of shunt tubes 203 located just beneath the mesh stent 201. Shunt tubes 203 appear as holes from the side of the TMS assembly 200, and act as a channel for epoxy compound to flow from the inside of the TMS assembly 200 through the mesh stent. FIG. 2C illustrates a cross-sectional view of the TMS assembly 200. A plurality of tension wires 205 connect a plurality of supporters 207, with the mesh stent 209 wrapped around the outside of the supporters 207. A plurality of shunt tubes 211 transverse the cross-section, running from the mesh stent 209 to the inner core 213. Supporters 207 provide structural strength and rigidity to the mesh stent. Supporters may be made of high-strength material such as stainless steel. There may be 6 supporters as shown in FIG. 2C. The plurality of tension wires 205 are elastic and thus provide an elastic bond connecting the supporters 207 that allows for expansion of the supporters 207 and the mesh stent 201 while pumping the first reactive epoxy-containing compound. After pumping the first reactive epoxy-containing compound, supporters 207 return to their initial position due to the elasticity of the plurality of tension wires 205. In one or more embodiments, the TMS assembly utilizes a basalt fiber mesh which is pre-saturated with the second reactive epoxy-containing compound and enables a rapid chemical reaction and subsequent seal at the pinhole site with superior bonding. The non-metallic mesh avoids issues like galvanic corrosion and compatibility concerns. One with skill in the art will understand other meshes which avoid issues like galvanic corrosion and compatibility concerns and have similar physical properties will also be useful.

In one or more embodiments, epoxy resin is used to seal pinhole leaks in tubing-casing. In one or more embodiments, the epoxy used consists of two components, a diluent/curing agent referred to herein as the first reactive epoxy-containing compound and an epoxide which referred to herein as the second reactive epoxy-containing compound. The mechanical properties of cured epoxy resins can withstand the conditions in the oil and gas system. Epoxies are generally resistant to high temperatures and a wide range of chemical environments including strong acids, alkalis and $H_2S$. In one or more embodiments, the epoxy resin has a gel time of around 20 to 30 minutes to allow proper placement and a development of ultimate shear bond strength on steel surfaces. Higher temperatures will decrease the gel time of the epoxy resin, leading to faster curing reaction kinetics. Similarly, an increase in pressure can also decrease the gel time for some epoxy resins, as increased pressure leads to faster curing reaction kinetics.

There are many epoxy systems that would be suitable for sealing pinhole leaks in tubing and other well completion components. In one or more embodiments, Razeen® D7103 obtained from Jana may be used as the second reactive epoxy-containing compound, which possesses desirable metal adhesion properties. In one or more embodiments, Razeen® D7103 or a comparable epoxy, as the second reactive epoxy-containing compound impregnated in the mesh, is combined with Razeen® SL2711W57 or a comparable product, as the first reactive epoxy-containing compound pumped downhole. Razeen® D7103 is propyleneglycol diglycidyl ether diluent and Razeen® SL2711W57 is a general purpose, medium viscosity, bisphenol A based epoxy resin. One with ordinary skill in the art will understand that although this epoxy combination is applicable to the current invention, many others with similar thermomechanical and adhesion properties will be useful.

Process of Installation

In one or more embodiments, TMS installation begins by evaluating tubing-casing annulus (TCA) communication to locate any leaks. The proper depth is determined for placement of the tubing mesh stent assembly. The detection of leaks in the TCA can be accomplished using several methods. One common approach is pressure testing, where pressure is applied to the annulus and monitored over time. A decrease in pressure during a pressure test indicates a leak. Acoustic logging tools that listen for the noise produced by escaping fluids can also be used, as well as temperature logging tools that can detect temperature anomalies associated with fluid or gas leaks.

Determining the depth for the placement of the TMS assembly involves the use of downhole logging tools. These tools can provide detailed measurements of the characteristics of the well, enabling operators to locate leaks, defects, or areas of corrosion. Once the leak location is identified, the TMS assembly is set at that depth to seal the leak.

In one or more embodiments, the tubing mesh stent assembly and one or more reactive epoxy compounds are prepared at the well surface before lowering into the well. The mesh and reactive epoxy-containing compound are selected and prepared in accordance with the specifics of the well and the leak to optimize thermomechanical properties and long-term viability. In one or more embodiments, if necessary, workover operations are performed to remove any production tubing or equipment blocking access to the leak. A retrievable plug is installed as a barrier below the placement depth to secure the well.

In one or more embodiments, the tubing mesh stent assembly is lowered into the well to the leak depth using a shifting tool. The shifting tool is used to lower the tubing mesh stent assembly into the well to the depth of the leak. The shifting tool would be attached to the top of the TMS assembly and would connect to the wireline or coiled tubing for deployment into the well. The shifting tool may have a specific profile or mechanism to engage with the stent assembly, allowing it to control the expansion of the mesh stent and the activation of the packers once the assembly is at the desired depth. After the installation of the TMS, the shifting tool is disengaged and retrieved.

Figures 3A, 3B, 3C:
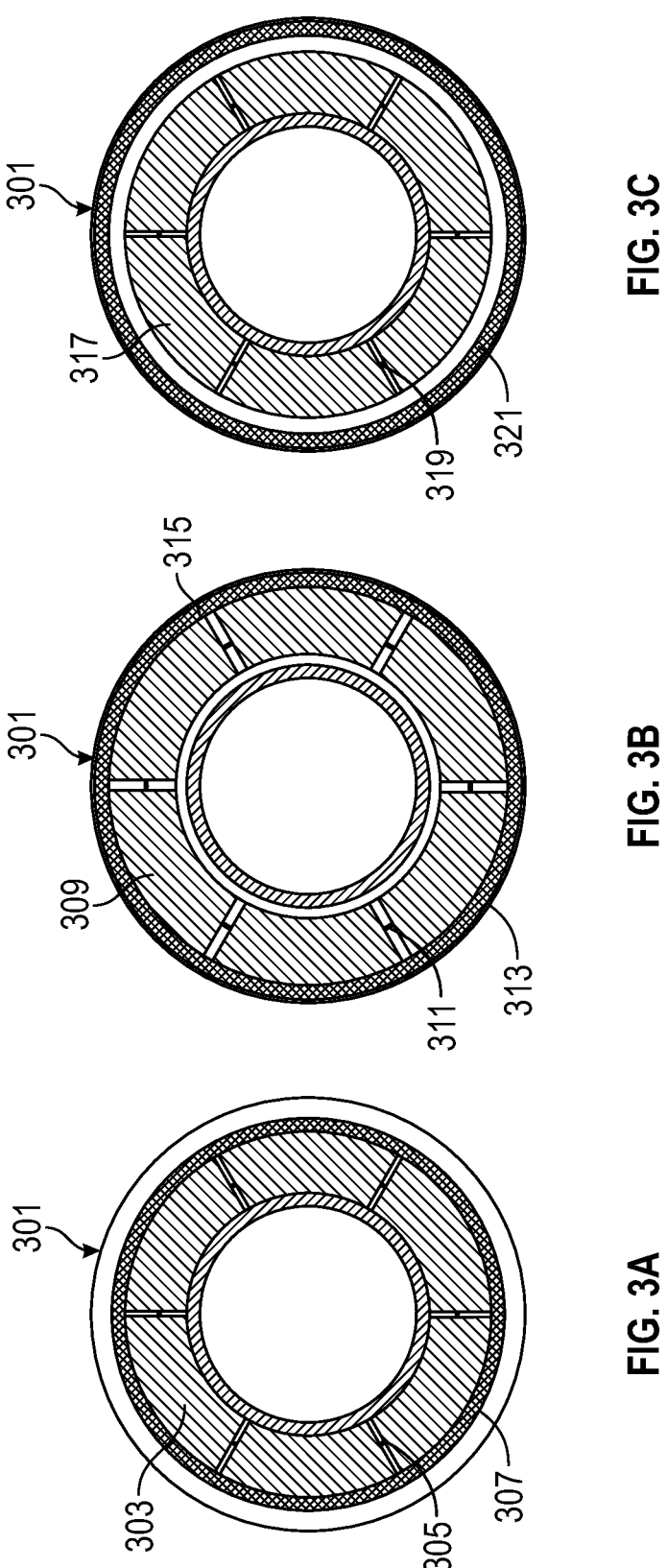
FIG. 3A is a schematic of the TMS assembly in an initial contracted state during TMS installation.
FIG. 3B is a schematic of the TMS assembly in an expanded state during TMS installation.
FIG. 3C is a schematic of the TMS assembly in a final contracted state during TMS installation.

In one or more embodiments, the tubing mesh stent assembly is expanded to firmly contact a wall of the well completion component being repaired. FIGS. 3A-C depict the TMS assembly at various stages of expansion during installation of the TMS. FIG. 3A shows the TMS assembly in its initial contracted state inside a well 301. In this initial contracted state, supporters 303 are packed together with tension wires 305 in a relaxed state. The TMS 307 is in a contracted state adjacent to the supporters.

FIG. 3B shows the TMS assembly in an expanded state. In the expanded state, supporters 309 are now expanded and spread apart from each other. Tension wires 311 are now expanded and under tension. TMS 313 is now held between supporters 309 and the well 301. In this expanded state, the reactive epoxy-containing compounds or other chemicals may be pumped through shunt tubes 315 to the TMS 313.

FIG. 3C shows the TMS assembly contracted again after TMS installation. Supporters 317 are now contracted and next to each other again, with tension wires 319 returning to a relaxed state. At this stage, the TMS 321 is installed on the wall of well 301.

In one or more embodiments, the tubing mesh stent assembly is set in place using packers positioned at each end of the tubing mesh stent assembly. The packers are hydraulically activated devices at each end of the mesh stent assembly. When hydraulic pressure is applied, the packers expand against the inner wall of the tubing, anchoring the TMS assembly in place and isolating the section containing the leak.

In one or more embodiments, the first reactive epoxy-containing compound is pumped through the tubing mesh stent assembly to fill the leak. Shunt tubes enable the flow of the first reactive epoxy-containing compound from the inner core to the mesh stent in a distributed manner. The first reactive epoxy-containing compound will then penetrate and impregnate the mesh, mixing with the second reactive epoxy-containing compound which was impregnated in the mesh during preparation, and the mixture will begin to react and harden. In one or more embodiments, all epoxy-containing compounds are allowed to react for up to 24 hours or more to cure. One with ordinary skill in the art will understand that the formation and well conditions will determine the minimum and optimal cure times. The cure time may be an amount ranging from a lower limit of one of 5, 6, 7, 8, 9, or 10 min to an upper limit of one of 55, 56, 57, 58, 59, or 60 min where any lower limit can be used with any mathematically compatible upper limit. The cure temperature may be greater than 25° C., and the pressure during curing may be ambient pressure or greater.

Figure 4:
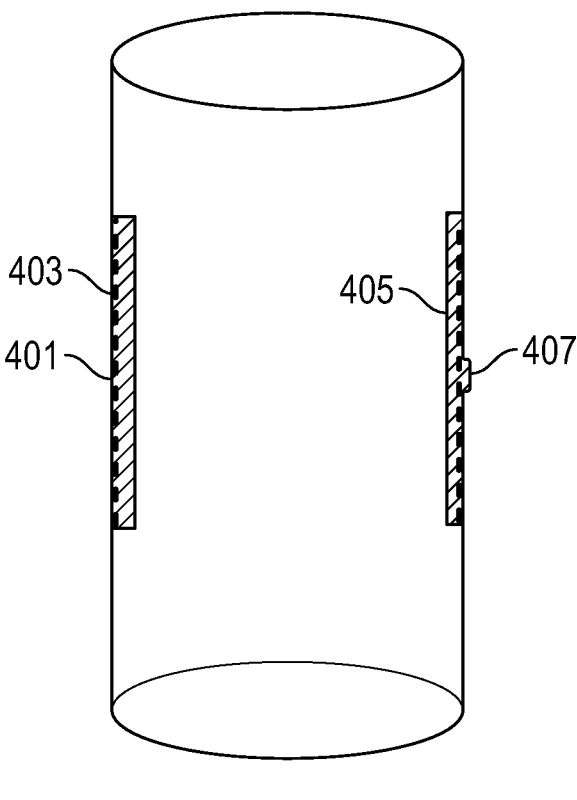
FIG. 4 is a schematic of a section of well tubing after being repaired using a tubing mesh stent system in accordance with one or more embodiments of the present disclosure.

In one or more embodiments, the shifting tool is removed and workover operations are reversed to resume normal production. This includes removing the retrievable plug and testing the well under pressure to ensure integrity at normal operating conditions. A typical procedure to ensure that the leak repaired is to create a pressure difference between TCA and tubing. The pressure differential is then sustained for a period of time, less than an hour, during which continual monitoring takes place. If the measured pressure remains stable, it indicates that the well is holding the pressure effectively and the leak is considered repaired. If the pressure drops, it suggests the leak was not repaired or there is another leak, requiring further investigation. FIG. 4 illustrates a section of production tubing that has been repaired using the above described method and using the TMS assembly. Mesh stent 403 is held onto the side of tubing 401 by epoxy 405. Epoxy 405 hardens and forms a layer inside the mesh, and also impregnates the mesh and hardens throughout the mesh. Epoxy 405 fills and hardens inside any pinhole leaks 407, sealing the pinhole leaks 407.

System for Repairing Well Completion Components

In another aspect, embodiments disclosed herein relate to a system for repairing well completion components, such as repairing pinhole leaks in tubing, casings, or liners. The system as described herein is used for sealing pinhole leaks in production tubing but could also be used for other well components such as liners and casings. The system for repairing well completion components includes the TMS assembly as described above. The system may also include a shifting tool used to place the tubing mesh stent assembly at the desired depth in the well completion component. In one or more embodiments, the tubing mesh stent assembly is lowered into the well to the leak depth using a shifting tool. The shifting tool is as described above.

In one or more embodiments, the TMS assembly is constructed and functions as described above. The TMS assembly includes an upper section, a middle section, and a lower section, with the upper and lower sections including hydraulically activated packers with chemical-resistant elastomer bodies, and with the middle section comprises a mesh stent which is expandable. In one or more embodiments, the hydraulically activated packers seal and anchor the tubing mesh stent assembly during application. The size, shape and material of the mesh stent are designed to suit the size of the well completion component and cover detected leaks. In one or more embodiments, the mesh stent includes fibers selected from the group consisting of basalt fibers, glass fibers, carbon fibers, aramid fibers, polymer fibers, metal fibers and ceramic fibers.

In one or more embodiments, the tubing mesh stent assembly is set in place using packers positioned at each end of the tubing mesh stent assembly. The packers are as described above.

In one or more embodiments, a first reactive epoxy-containing compound is pumped through the tubing mesh stent assembly to fill all voids in and around the leaks and the mesh stent is impregnated with a second reactive epoxy-containing compound prior to use. In one or more embodiments, the first reactive epoxy-containing compound is diluted with water before pumping. Shunt tubes enable the flow of the first reactive epoxy-containing compound from the inner core to the mesh stent in a distributed manner. In one or more embodiments, shunt tubes placed through the mesh stent direct the first reactive epoxy-containing compound and minimize trapped air.

In one or more embodiments, the first reactive epoxy-containing compound may be an amine-containing epoxy such as Razeen® SL2711W57. The Razeen® SL2711W57 formulation is based on Bisphenol A and polyamidoamine. In one or more embodiments, the second reactive epoxy-containing compound may be a propylene glycol diglycidyl ether-containing epoxy such as Razeen® D7103. The reactive epoxy-containing compounds are selected based on well conditions including temperature and hardness. One with ordinary skill in the art will understand varying formation and well conditions and application requirements will necessitate selection of an epoxy system that is appropriate for the conditions and thermomechanical requirements.

In one or more embodiments, Razeen® D7103 obtained from Jana may be used as the second reactive epoxy-containing compound, which possesses desirable metal adhesion properties. In one or more embodiments, Razeen® D7103 or a comparable epoxy, as the second reactive epoxy-containing compound impregnated in the mesh, is combined with Razeen® SL2711W57 or a comparable product, as the first reactive epoxy-containing compound pumped downhole. Razeen® D7103 is propyleneglycol diglycidyl ether diluent and Razeen® SL2711W57 is a general purpose, medium viscosity, bisphenol A based epoxy resin. One with ordinary skill in the art will understand that although this epoxy combination is applicable to the current invention, many others with similar thermomechanical and adhesion properties will be useful. In one or more embodiments, all epoxy-containing compounds are allowed to react for up to 24 hours or more to cure. One with ordinary skill in the art will understand that the formation and well conditions will determine the minimum and optimal cure times. The cure time may be an amount ranging from a lower limit of one of 5, 6, 7, 8, 9, or 10 min to an upper limit of one of 55, 56, 57, 58, 59, or 60 min where any lower limit can be used with any mathematically compatible upper limit. The cure temperature may be greater than 25° C., and the pressure during curing may be ambient pressure or greater.

Embodiments of the present disclosure may provide at least one of the following advantages. The method and system described herein provide a cost-effective alternative to conventional tubing patch and remediation techniques. The process to seal leaks with the TMS system requires minimal downhole intervention or well workover when compared to other methods of repair, avoiding operational delays and minimizing risk. Additionally, the mesh stent will remain in place for the life of the well as a reinforcing layer of protection, reducing the chance of future pinhole leaks in that area of tubing.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method to repair well completion components, the method comprising:
evaluating tubing-casing annulus (TCA) communication to locate a leak;
determining a placement depth for a tubing mesh stent assembly;
preparing the tubing mesh stent assembly, a first reactive epoxy-containing compound, and a second reactive epoxy-containing compound at a well surface according to specifics of the well and the leak;
impregnating the mesh stent with the second reactive epoxy-containing compound;
performing workover operations to remove one or more of production tubing and equipment blocking access to the leak;
installing a retrievable plug as a barrier below the placement depth to secure the well;

running the tubing mesh stent assembly into the well to the leak depth using a shifting tool;
expanding the tubing mesh stent assembly to firmly contact a wall of the well completion component being repaired;
setting the tubing mesh stent assembly in place using a plurality of packers positioned at each end of the tubing mesh stent assembly;
pumping the first reactive epoxy-containing compound through the tubing mesh stent assembly to fill the leak;
allowing all epoxy-containing compounds to react to cure, removing the shifting tool and reversing workover operations to resume normal production including removing the retrievable plug; and
testing the well under pressure to ensure integrity at normal operating conditions;
wherein the mesh stent is configured to absorb and retain the second reactive epoxy-containing compound.

2. The method of claim 1, further comprising diluting the first reactive epoxy-containing compound with water before pumping.

3. The method of claim 1, wherein the tubing mesh stent assembly comprises an upper section, a middle section, and a lower section, wherein the upper and lower sections comprise hydraulically activated packers comprising chemical-resistant elastomer bodies, wherein the middle section comprises a mesh stent which is expandable.

4. The method of claim 1 wherein the mesh stent comprises fibers selected from the group consisting of basalt fibers, glass fibers, carbon fibers, aramid fibers, polymer fibers, metal fibers, and ceramic fibers.

5. The method of claim 1, wherein pumping the first reactive epoxy-containing compound through the tubing mesh stent assembly comprises placing shunt tubes through the mesh stent to direct epoxy flow and minimize trapped air.

6. A system for repairing leaks in well completion components, the system comprising:
a tubing mesh stent assembly comprising an upper section, a middle section, and a lower section, wherein the upper and lower sections comprise hydraulically activated packers comprising chemical-resistant elastomer bodies, and wherein the middle section comprises a mesh stent which is expandable;
wherein the mesh stent is impregnated with a second reactive epoxy-containing compound,
wherein the second reactive epoxy-containing compound is to be mixed with a first reactive epoxy-containing compound.

7. The system of claim 6, further comprising a shifting tool to place the tubing mesh stent assembly at a desired depth in the well completion component.

8. The system of claim 6, wherein the hydraulically activated packers seal and anchor the tubing mesh stent assembly during application.

9. The system of claim 6, where the first reactive epoxy-containing compound is pumped through the tubing mesh stent assembly to fill all voids in and around the leaks.

10. The system of claim 6, wherein the well completion components include tubing, casings, and liners.

11. The system of claim 6, wherein the size, shape and material of the mesh stent are designed to suit the size of the well completion component and cover detected leaks.

12. The system of claim 9, wherein the mesh stent is impregnated with the second reactive epoxy-containing compound prior to use.

13. The system of claim 12, wherein the first reactive epoxy-containing compound and second reactive epoxy-containing compound are selected based on well conditions including temperature and hardness.

14. The system of claim 13, wherein the first reactive epoxy-containing compound comprises an epoxy resin comprising bis-phenol A and polyamidoamine, and the second reactive epoxy-containing compound comprises propylene glycol diglycidyl ether.

15. The system of claim 9, wherein shunt tubes placed through the mesh stent direct the first reactive epoxy-containing compound and minimize trapped air.

16. The system of claim 9, wherein the first reactive epoxy-containing compound is diluted with water before pumping.

17. The system of claim 6, wherein the mesh stent comprises fibers selected from the group consisting of basalt fibers, glass fibers, carbon fibers, aramid fibers, polymer fibers, metal fibers, and ceramic fibers.

* * * * *